United States Patent
Garcia

(10) Patent No.: US 7,232,258 B2
(45) Date of Patent: Jun. 19, 2007

(54) PASSIVE BEARING CLEARANCE CONTROL USING A PRE-SWIRLER

(75) Inventor: Angel M. Garcia, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 93 days.

(21) Appl. No.: 11/140,118

(22) Filed: May 27, 2005

(65) Prior Publication Data

US 2005/0286824 A1 Dec. 29, 2005

Related U.S. Application Data

(60) Provisional application No. 60/582,158, filed on Jun. 23, 2004.

(51) Int. Cl.
*F16C 37/00* (2006.01)
(52) U.S. Cl. .................................... 384/476; 384/900
(58) Field of Classification Search ............... 384/476, 384/900, 317, 321, 475
See application file for complete search history.

(56) References Cited

U.S. PATENT DOCUMENTS

| 2,854,296 | A | * | 9/1958 | Eberle et al. ............... 384/476 |
| 5,192,139 | A | * | 3/1993 | Hiramoto et al. .......... 384/476 |
| 5,749,660 | A | * | 5/1998 | Dusserre-Telmon et al. ......................... 384/475 |
| 5,915,843 | A | * | 6/1999 | Mattera ..................... 384/316 |
| 6,117,063 | A | * | 9/2000 | Szepessy et al. ........... 384/476 |

* cited by examiner

*Primary Examiner*—Thomas R. Hannon

(57) ABSTRACT

A rotary bearing for high speed and high temperature use is disclosed, the bearing having an inner race and an outer race with a roller ball positioned between the races, and a cooling fluid passageway passing through the races, where one of the passages in the outer race is directed radially inward toward the inner race and at substantially a tangent direction to the inner race, the tangential directed cooling passage providing a swirl to the cooling fluid such that the cooling fluid exits the outer race at a tangential velocity substantially equal to the rotational velocity of the inner race. Since the cooling fluid entering the inner race is traveling at a velocity substantially equal to the rotational velocity of the inner race, the temperature of the cooling fluid drops, and the cooling ability of the inner race is increased.

11 Claims, 4 Drawing Sheets

PASSIVE BEARING CLEARANCE CONTROL USING A PRE-SWIRLER

CROSS-REFERENCE TO RELATED APPLICATIONS

The present invention claims the benefit to U.S. Provisional Application No. 60/582,158 filed on Jun. 23, 2004 and entitled "Oil-less bearing".

STATEMENT REGARDING FEDERALLY SPONSORED RESEARCH OR DEVELOPMENT

None apply.

TECHNICAL FIELD

1. Field of the Invention

The present invention relates to a high speed bearing that does not require a lubricant to be circulated through the bearing, and that includes cooling passages within the races and/or around the races.

2. Description of the Related Art Including Information Disclosed Under 37 CFR 1.97 and 1.98

DETAILED DESCRIPTION OF THE INVENTION

Figure 1:
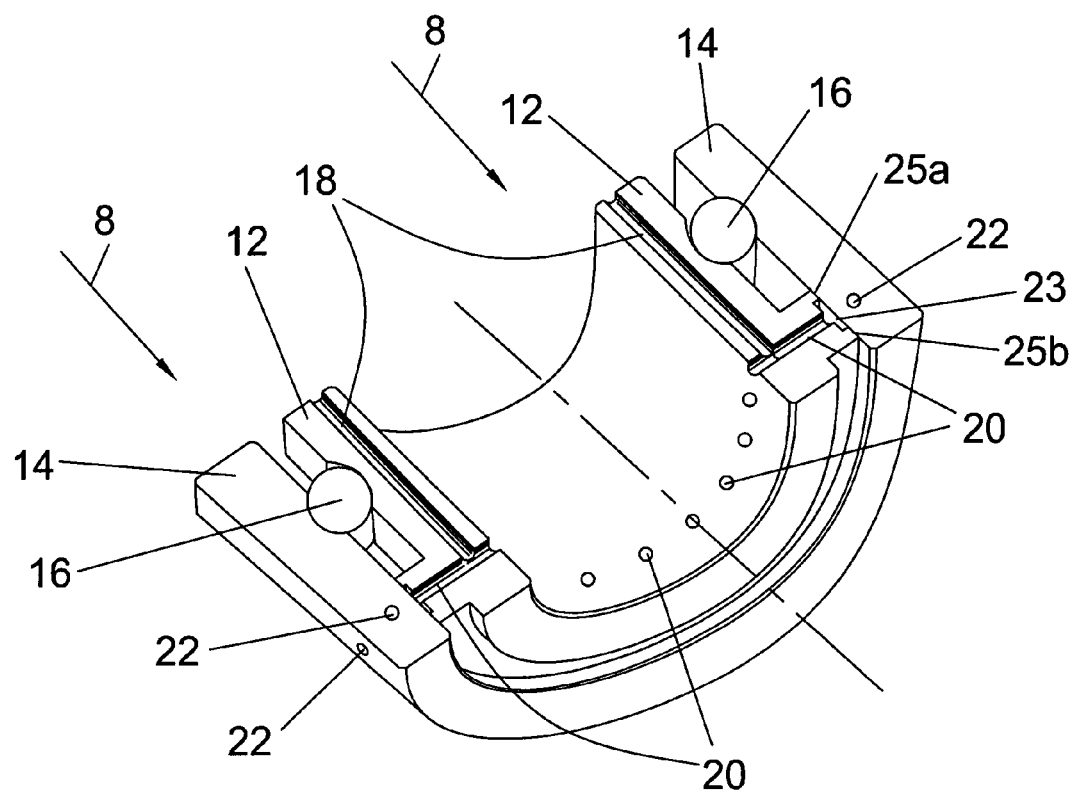
FIG. 1 shows a three dimensional view of a cross section through halve of the bearing in a plane parallel to a rotational axis of the bearing.

The present invention is a high speed oil-less bearing for use in a high temperature environment. The intended use for the bearing of the present invention is in a small gas turbine engine used in a cruise missile. FIG. 1 shows the bearing in a three dimension view of a cross sectional of the bearing with an inner race 12, an outer race 14, a roller ball 16, an inner race longitudinal cooling passage 18, an inner race radial cooling passage 20, and an outer race swirl passage 22. An annular entrance chamber 23 is formed on the radial outer end of the inner race radial cooling passages 20, the annular chamber 23 forming an annular passage around the perimeter of the inner race. On the sides of the annular chamber 23 are projections that form a seal 25a and 25b between the inner race 12 and the outer race 14. The annular chamber 23 receives the air flow from the outer race swirl passages 22. The present invention shows the annular chamber as part of an extension on the inner race 12. However, the annular chamber could be on a projection extending from an inside surface of the outer race 14 and forming two sealing surfaces against a surface of the inner race.

Figure 2:
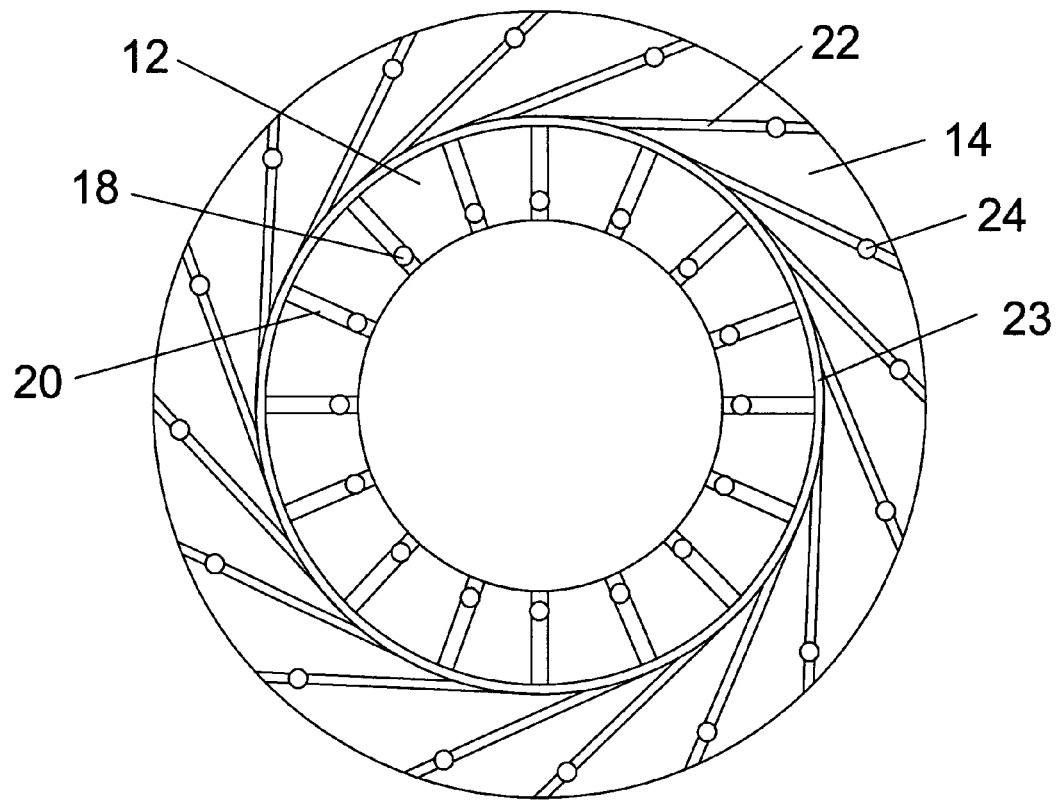
FIG. 2 shows a sectional view of the bearing along the axis of rotation and parallel to a plane passing through the cooling passages in the radial directions.

FIG. 2 shows cross sectional views of the bearing with the inner race 12 and the outer race 14, the inner race longitudinal cooling passages 18 and the inner race radial cooling passages 20, outer race longitudinal cooling passages 24, and the outer race swirl cooling passages 22. The annular chamber 23 is located on the outer side of the inner race 12, and the inner race radial passages 20 lead into the annular chamber 23.

Figure 3:
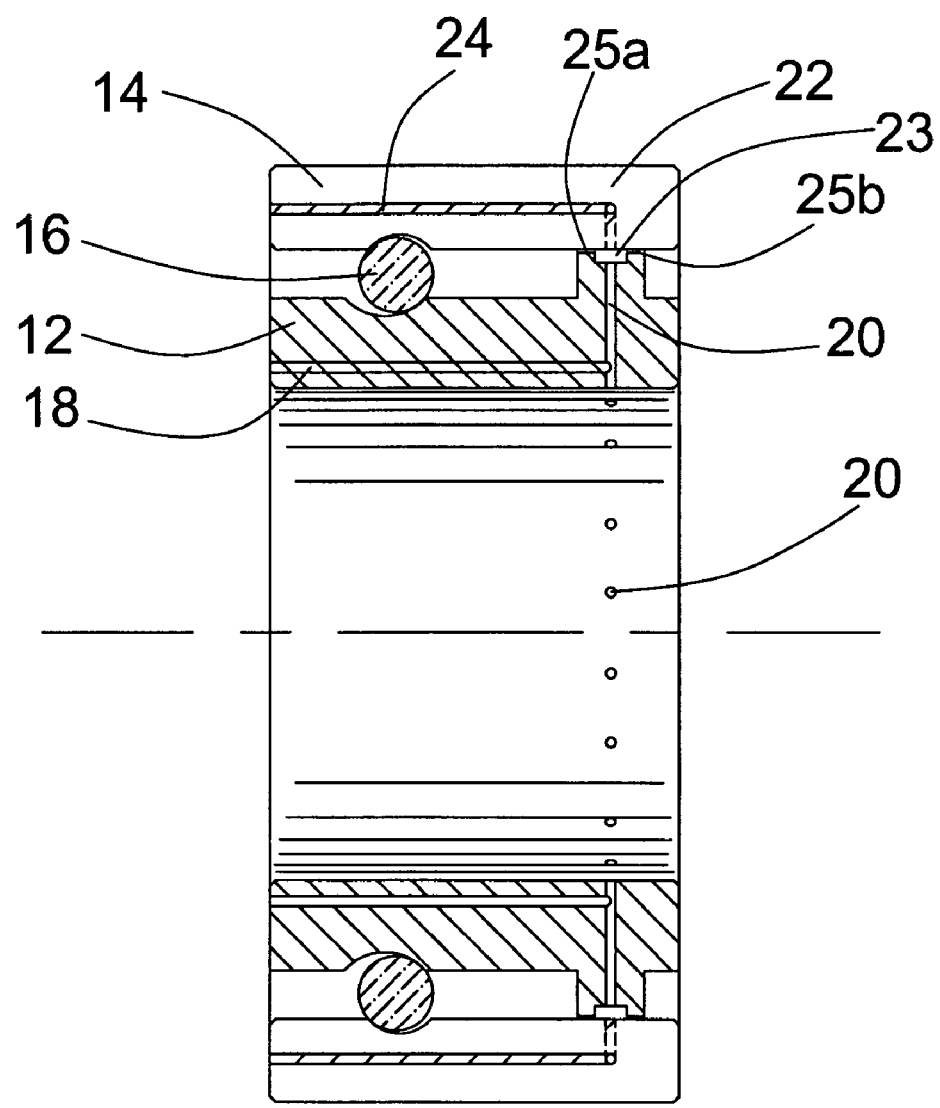
FIG. 3 shows a sectional view of the bearing half in a plane parallel to the axis of rotation of the bearing.

FIG. 3 shows the bearing with the inner race 12 and the outer race 14, and the cooling fluid passages therein. Cooling air enters the outer race longitudinal passages 24, flows into the outer race radial passages 22 toward the annular chamber 23, into the inner race radial passages 20, and then into the inner race longitudinal passages 18, providing a cooling fluid to both races.

The roller balls 16 are made of ceramic silicon nitride to reduce the centrifugal loads due to their lower density compared to steel. Roller balls of this material have a high hardness which results in excellent wear resistance and longer life for the bearing. The outer race 14 and inner race 12 are made of materials such as 440C which are tempered at 600 degrees F. and above, or Stellite 6B and MP159 which allows for a long shelf life after storage in a humid environment without rusting.

The bearing of the present invention uses no cage to retain the roller balls. Eliminating the cages reduces the friction, reduces heat generation, and increases bearing life. The bearing internal clearance is in the range of 0.0005 inches to 0.0012 inches. The cooling passages in the races are arranged to cool both races to about the same temperature. If the inner race reaches a temperature much higher than the temperature of the outer race, the distance between contact points for the roller balls on the races will decrease, and the stress will increase, leading to faster wear. The pre-swirl cooling passages 22 in the outer race are angled with respect to the rotational axis of the bearing from zero degrees to about 30 degrees, and preferably in the range from 10-20 degrees.

The concept here is to pre-swirl the cooling air to a tangential velocity approximately equal to the tangential velocity of the bearing's inner race. This ensures that the inner race receives a lower relative temperature for cooling than the outer ring, providing effective clearance control. Additional cooling can be achieved by vortexing to the inner ring passages 18 through the radial passages 20. An entrance chamber 23 is formed at the beginning of the inner race radial passages 20. Leakage of cooling air can be reduced by controlling the gap clearances (25a, 25b) to within a range of 0.001 inches to 0.0002 inches.

In operation, the bearing is mounted in an engine in which airflow 8 flows toward the bearing 10 as seen in FIG. 1. Portions of this airflow 8 will enter the outer race longitudinal passages 24 and flow toward the outer race swirl passages 22. The outer race 14 is non-rotating since it is secured to the engine casing. The airflow in the outer race swirl passages 22 as seen in FIG. 2 flows toward the inner race in a direction tangential to the inner race. The airflow from the outer race swirl passage 22 then flows into annular chamber 23, and then into the inner race radial passages 20, and from the inner race radial passages 20 into the inner race longitudinal passages 18 and out from the bearing 10 in an opposite direction to the original airflow 8. The outer race swirl passages 22 are set at such an angle that the airflow through these passages increases in tangential velocity to approximately the wheel speed of an outer surface of the inner race. This increased tangential velocity of the air flow will produce a drop in the temperature of the cooling air (due to a conservation of energy), and therefore provide a higher thermal gradient between the inner race of the bearing and the cooling air. Thus, a more effective cooling takes place. When the bearing is mounted in the casing and on the rotating shaft, radial passages 20 and swirl passages 22 are blocked by the shaft and the casing to prevent air flow from passing out these openings. The openings of longitudinal passages 24 and 18 are left open to allow airflow into and out of these passages.

The number of passageways and size of the passageways can vary depending on the cooling requirements of the bearing. Larger passageways will allow for greater volume of cooling fluid. So would an increase the number of passageways. However, using larger size or greater number of passageways could decrease the rigidity of the races.

The bearing life is increased by providing for a special coating on the races. A coating of Tungsten Disulfide or Titanium Sulfide is applied which reduces the coefficient of friction compared with oil, and also reduces heat generation in the bearing. This coating also acts as a self-lubricant for the bearing rolling contact surface. Grease with a grease retainer can also be applied to the bearing to add additional lubrication. Suitable commercially available grease is DSF-5000 available from Schaefer Mfg. Co., of St. Louis, Mo. 63104. Also, an oil/fuel mist or VPL can also be used for lubricating the bearing.

Figure 4:
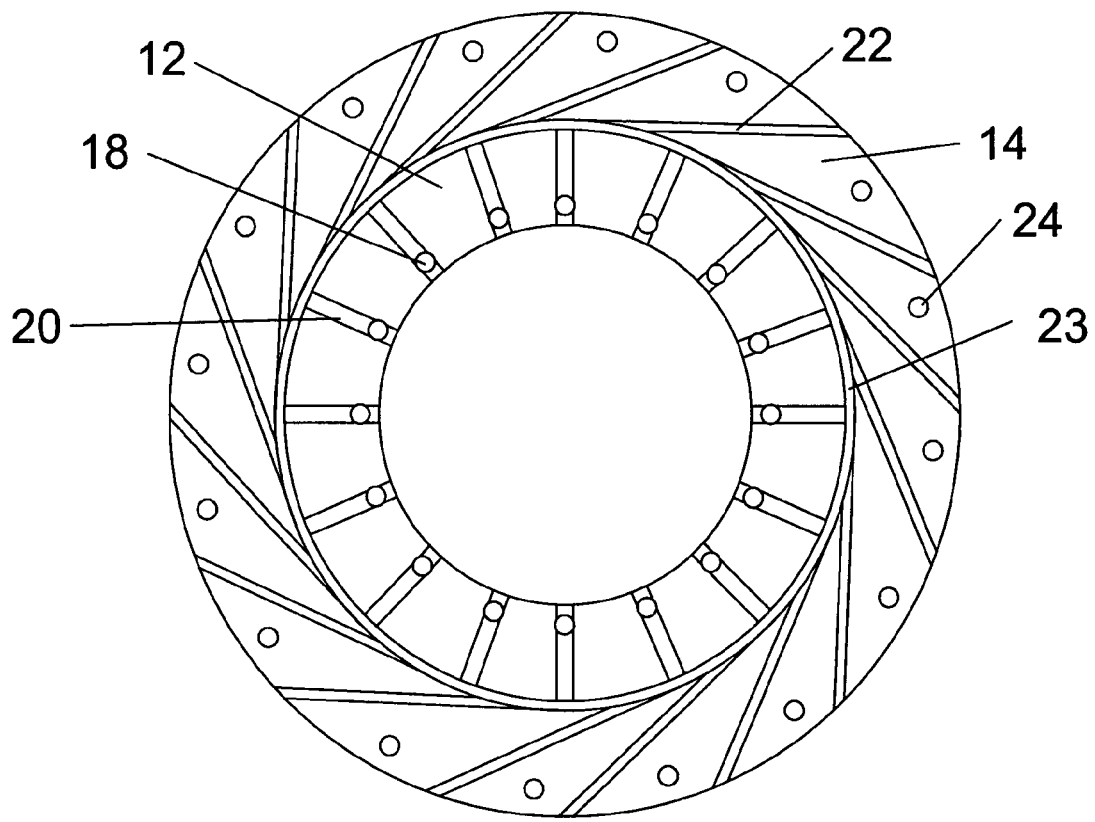
FIG. 4 shows a second embodiment of the present invention in which the cooling holes 24 do not intersect with the cooling holes 22 as in the first embodiment.

A second embodiment of the bearing of the present invention is shown in FIG. 4 in which the longitudinal cooling passages 24 in the outer race 14 does not intersect or make a fluid connection to the radial and tangential cooling holes 22 as is shown in the first embodiment and in FIG. 2. in the second embodiment, the outer race would be mounted such that the openings of the cooling holes 22 are not blocked in order to allow for cooling fluid to enter the cooling passages 22. The second embodiment of FIG. 4 operates in the same way as described with respect to the first embodiment.

The invention claimed is:

1. A rotary bearing, comprising:
    An inner race;
    An outer race;
    Roller ball means positioned between the inner race and the outer race to allow for relative rotation between the inner race and the outer race;
    A first cooling passage located in the outer race and having an inlet and an outlet, the outlet being in a direction substantially tangent to the inner race;
    A second cooling passage located in the inner race and having an inlet and an outlet, the inlet being in fluid communication with the outlet of the first cooling passage.

2. The rotary bearing of claim 1, and further comprising:
    An annular chamber formed on one of the races and being in fluid communication with both the first and the second cooling passages.

3. The rotary bearing of claim 1, and further comprising:
    The outlet of the first cooling passage having a fluid flow direction substantially tangent to a rotating surface of the inner race.

4. The rotary bearing of claim 1, and further comprising:
    The roller ball means being a ball made of ceramic silicon nitride.

5. The rotary bearing of claim 1, and further comprising:
    The inner race and the outer race each having a coating of Tungsten Disulfide or Titanium Sulfide applied to a contact surface of the roller ball means.

6. The rotary bearing of claim 1, and further comprising:
    A plurality of the first and second cooling passages spaced around the bearing to provide for cooling of the bearing.

7. The rotary bearing of claim 1, and further comprising:
    The first fluid passage includes a substantially longitudinal cooling passage in fluid communication with a substantially radial cooling passage, the radial cooling passage having an outlet in a direction substantially tangent to a rotation of the inner race; and,
    The second fluid passage includes a substantially radial cooling passage in fluid communication with a substantially longitudinal cooling passage.

8. The rotary bearing of claim 1, and further comprising:
    The first fluid passage includes a substantially longitudinal cooling passage and a substantially radial cooling passage, the substantially longitudinal cooling passage being non-intersecting with the substantially radial cooling passage, the radial cooling passage having an outlet in a direction substantially tangent to a rotation of the inner race; and,
    The second fluid passage includes a substantially radial cooling passage in fluid communication with a substantially longitudinal cooling passage.

9. A method of cooling a rotary bearing, the rotary bearing having an inner race, an outer race, and roller ball means located between the races, the method comprising the steps of:
    Passing a cooling fluid through the outer race;
    Directing the cooling fluid from the outer race into a direction substantially tangent to the inner race;
    Passing the cooling fluid from the outer race through the inner race; and,
    Directing the cooling fluid out of the bearing.

10. The method of cooling a rotary bearing of claim 9, and further comprising the step of:
    Directing the cooling fluid from the outer race into a direction substantially tangent to a rotational direction of the inner race at a speed substantially equal to a rotational speed of an outer surface of the inner race.

11. The method of cooling a rotary bearing of claim 10, and further comprising the step of:
    Providing for a plurality of cooling fluid passages through the inner and the outer races.

* * * * *